United States Patent
Maurer et al.

(10) Patent No.: US 10,000,388 B2
(45) Date of Patent: Jun. 19, 2018

(54) PRODUCTION OF PCC

(71) Applicants: Omya International AG, Oftringen (CH); Coatex, Genay (FR)

(72) Inventors: Marc Maurer, Village-Neuf (FR); Christian Jacquemet, Lyons (FR); Mathieu Skrzypczak, Terrace Park, OH (US)

(73) Assignees: Omya International AG, Oftringen (CH); Coatex, Genay (FR)

(*) Notice: Subject to any disclaimer, the term of this patent is extended or adjusted under 35 U.S.C. 154(b) by 0 days. days.

(21) Appl. No.: 15/302,652

(22) PCT Filed: Apr. 30, 2015

(86) PCT No.: PCT/EP2015/059605
§ 371 (c)(1),
(2) Date: Oct. 7, 2016

(87) PCT Pub. No.: WO2015/166090
PCT Pub. Date: Nov. 5, 2015

(65) Prior Publication Data
US 2017/0050862 A1      Feb. 23, 2017

Related U.S. Application Data

(60) Provisional application No. 62/090,466, filed on Dec. 11, 2014.

(30) Foreign Application Priority Data

Apr. 30, 2014 (EP) .................. 14166751

(51) Int. Cl.
C01F 11/18 (2006.01)
C09C 1/02 (2006.01)
C08K 3/26 (2006.01)

(52) U.S. Cl.
CPC .............. C01F 11/183 (2013.01); C08K 3/26 (2013.01); C09C 1/021 (2013.01);
(Continued)

(58) Field of Classification Search
None
See application file for complete search history.

(56) References Cited

U.S. PATENT DOCUMENTS 5,007,964 A  4/1991  Tsukisaka et al.
5,232,678 A  8/1993  Bleakley et al.
(Continued)

FOREIGN PATENT DOCUMENTS

CN  1332207 A   1/2002
CN  101570343 A  11/2009
(Continued)

OTHER PUBLICATIONS

Office Action dated Dec. 20, 2016 for Australian Patent Appln. No. 2015254543.
(Continued)

*Primary Examiner* — Daniel Berns
(74) *Attorney, Agent, or Firm* — Amster, Rothstein & Ebenstein LLP

(57) ABSTRACT

The present invention is directed to a process for producing an aqueous suspension of precipitated calcium carbonate, wherein a milk of lime is prepared by mixing water, a calcium oxide containing material, at least one water-soluble polymer having a molecular weight $M_w$ in the range from 200 to 6500 g/mol, and at least one slaking additive, and subsequently, the milk of lime is carbonated to form an aqueous suspension of precipitated calcium carbonate.

37 Claims, 1 Drawing Sheet

(52) U.S. Cl.
CPC ...... *C01P 2004/51* (2013.01); *C01P 2006/12* (2013.01); *C01P 2006/22* (2013.01); *C08K 2003/265* (2013.01); *Y02P 20/582* (2015.11)

(56) References Cited

U.S. PATENT DOCUMENTS

| | | | |
|---|---|---|---|
| 5,558,850 | A | 9/1996 | Bleakley et al. |
| 6,294,143 | B1 | 9/2001 | Deutsch et al. |
| 2011/0035560 | A1 | 2/2011 | Bodrozie et al. |

FOREIGN PATENT DOCUMENTS

| | | | |
|---|---|---|---|
| CN | 103523813 | A | 1/2014 |
| EP | 0313483 | A1 | 4/1989 |
| EP | 0844213 | A1 | 5/1998 |
| EP | 2371766 | A1 | 10/2011 |
| EP | 2447213 | A1 | 5/2012 |
| EP | 2524898 | A1 | 11/2012 |
| EP | 2537900 | A1 | 1/2016 |
| JP | 2008074629 | A | 4/2008 |
| WO | 2003004414 | A1 | 1/2003 |
| WO | 2004106236 | A1 | 12/2004 |
| WO | 2005000742 | A1 | 1/2005 |
| WO | 2006/005793 | A1 | 1/2006 |
| WO | 2010018432 | A1 | 2/2010 |
| WO | 2011121065 | A1 | 10/2011 |
| WO | 2013142473 | A1 | 9/2013 |

OTHER PUBLICATIONS

Office Action dated Mar. 6, 2017 for Australian Patent Appln. No. 2015254543.
Office Action dated May 9, 2017 for Australian Patent Appln. No. 2015254543.
Office Action dated Sep. 29, 2017 for Canadian Patent Appln. No. 2,945,561.
Office Action dated Oct. 27, 2016 for Chilean Patent Appln. No. 201602744.
Search Report dated Nov. 5, 2014 for European Patent Appln. No. 14166751.9.
Office Action dated Feb. 21, 2017 for European Patent Appln. No. 14166751.9.
Kirchgessner et al. "Lignosulfonate-Modified Calcium Hydroxide for Sulfur Dioxide Control." Ind. Eng. Chem. Res. 1987 (26) 2397-2400.
Varma et al. "Gas-Liquid Reactive Crystallization for hte Synthesis of CaCO3 Nanocrystals." Materials Chemistry and Physics 126 (2011) 232-236.
Garcia-Carmona et al. "Morphological Characteristics and Aggregation of Calcite Crystals Obtained by Bubbling CO2 Through a CA(OH)2 Suspension in the Presence of Additives." Powder Technology 130 (2003) 307-315.
The International Search Report dated Aug. 12, 2015 for PCT/EP2015/059605.
The Written Opinion of the International Searching Authority dated Aug. 12, 2015 for PCT/EP2015/059605.
Office Action dated Nov. 21, 2017 for Japanese Patent Appln. No. 2016-565355.
Office Action dated Jan. 19, 2018 for Russian Patent Appln. No. 2016145929.

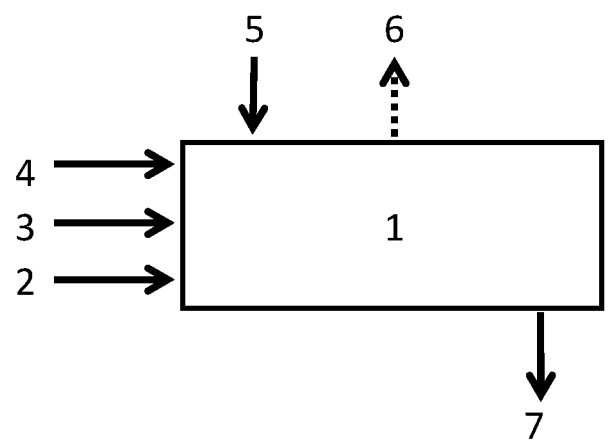

PRODUCTION OF PCC

CROSS-REFERENCE TO RELATED APPLICATIONS

This is a U.S. national phase of PCT Application No. PCT/EP2015/059605, filed Apr. 30, 2015, which claims priority to European Application No. 14166751.9, filed Apr. 30, 2014 and U.S. Provisional Application No. 62/090,466, filed Dec. 11, 2014.

The present invention relates to a process for the production of precipitated calcium carbonate, the precipitated calcium carbonate obtained by this process, its use as well as the use of a combination of a polymer and slaking additive in said process.

Calcium carbonate is one of the most commonly used additives in the paper, paint and plastics industries. While naturally occurring ground calcium carbonate (GCC) is usually used as a filler in many applications, synthetically manufactured precipitated calcium carbonate (PCC) may be tailor-made with respect to its morphology and particle size allowing this materials to fulfil additional functions.

Commonly known PCC production processes including the steps of slaking quicklime with water, and subsequently precipitating calcium carbonate by passing carbon dioxide through the resulting calcium hydroxide suspension, produce only PCC slurries with low solids content. Therefore, these processes typically comprise a subsequent up-concentration step in order to obtain a more concentrated PCC slurry, for example, for shipping the PCC slurry. However, such additional up-concentration steps are energy-consuming and cost-intensive and require equipment such as a centrifuge, which is expensive and needs high maintenance. Furthermore, mechanical dewatering processes using centrifuges can destroy the structure of the formed PCC, for example, in case of clustered scalenohedral PCC.

WO 2011/121065 A1 discloses a process for preparing PCC comprising inter alia the step of preparing an aqueous suspension of PCC seeds by carbonating a suspension of calcium hydroxide in the presence of strontium hydroxide. A process for producing PCC, wherein the addition rate of the calcium carbonate slurry to the reaction vessel is such that a certain electrical conductivity is maintained in the reaction vessel, is described in EP 2 537 900 A1.

US 2011/035560 A1 describes a method to manufacture PCC involving the use of a comb polymer, which reduces the carbonation time of the PCC. A grinding agent for grinding coarse lime is disclosed in EP 0 313 483 A1. EP 2 447 213 A1 relates to the production of high purity PCC involving the step of slaking lime with an aqueous ammonium chloride solution.

WO 2013/142473 A1 relates to a process comprising the steps of preparing slaking quick lime to obtain slaked lime, and subjecting the slaked lime, without agitation, without prior cooling in a heat exchanger, and in the absence of any additives, to carbonation with carbon dioxide gas to produce PCC. PCC production processes including additives are disclosed in U.S. Pat. Nos. 6,294,143, 5,232,678, and 5,558,850. A method for producing slaked lime by slaking lime with a polymer having anionic groups is described in JP 2008/074629 A. EP 0 844 213 A1 discloses a method of producing a precipitate of an alkaline earth metal compound involving the use of a dispersing agent.

WO 2010/018432 A1 discloses a process to prepare precipitated calcium carbonate implementing low charge acrylate and/or maleinate-containing polymers. A process for producing platy precipitated calcium carbonate involving the step of adding a polyacrylate to a suspension of calcium hydroxide prior to the completion of carbonation is described in WO 2005/000742 A1. WO 2004/106236 A1 relates to a process for producing platy precipitated calcium carbonate involving the step of adding a dry condensed phosphate additive to a suspension of calcium hydroxide prior to the completion of carbonation.

In view of the foregoing, there is a continuous need for processes providing precipitated calcium carbonate, and especially those which allow the direct production of PCC slurries with a high solids content without an additional up-concentration step.

Accordingly, it is an object of the present invention to provide a process for producing a PCC slurry with a high solids content at an acceptable viscosity. It is also desirable that said process does not require any mechanical or thermal up-concentration step. It is also desirable that said process does not affect the kinetics of the carbonation step in a negative way and/or does not impair the crystallographic structure of the PCC. The foregoing and other objects are solved by the subject-matter as defined herein in the independent claims.

According to one aspect of the present invention, a process for producing an aqueous suspension of precipitated calcium carbonate is provided, comprising the steps of:
  i) providing a calcium oxide containing material,
  ii) providing at least one water-soluble polymer having a molecular weight $M_w$ in the range from 200 to 6500 g/mol, wherein the at least one polymer has the chemical structure of formula (I)

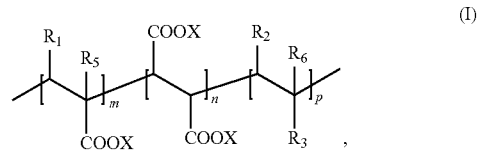
(I)

wherein n, m, and p are integers and at least one of n, m, or p is greater than zero and n+m+p is less than or equal to 70, $R_1$ is H or $CH_3$,
$R_2$ is H or $CH_3$,
$R_3$ is —C(=O)—O—$R_4$ or —C(=O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other,
$R_5$ is H or $CH_3$,
$R_6$ is H or $CH_3$, and
X is H and/or M, wherein M is Na, K, Li, Mg, and/or Ca,
and
wherein the structural units

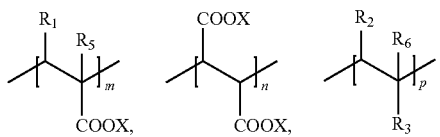

are arranged randomly, regularly and/or in blocks, iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof, iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12, and v) carbonating the milk of lime obtained from step iv) to form an aqueous suspension of precipitated calcium carbonate.

According to another aspect, the present invention provides a process for producing precipitated calcium carbonate comprising the steps i) to v) of the process according to the present invention, and further a step vi) of separating the precipitated calcium carbonate from the aqueous suspension obtained from step v).

According to still another aspect, the present invention provides an aqueous suspension of precipitated calcium carbonate obtainable by steps i) to v) of the process according to the present invention.

According to still another aspect, the present invention provides a precipitated calcium carbonate obtainable by steps i) to vi) of the process according to the present invention.

According to still another aspect, a product comprising the precipitated calcium carbonate according to the present invention is provided, preferably the product is a paper, a paper product, an ink, a paint, a coating, a plastic, a polymer composition, an adhesive, a building product, a foodstuff, an agricultural product, a cosmetic product or a pharmaceutical product.

According to still another aspect, a product comprising a dried precipitated calcium carbonate according to the present invention is provided, wherein the product is a plastic or a polymer composition.

According to still another aspect, a use of an aqueous suspension of precipitated calcium carbonate according to the present invention and/or precipitated calcium carbonate according to the present invention in paper, plastics, polymer compositions, paint, coatings, concrete, cosmetics, pharmaceutics and/or agriculture applications is provided.

According to still another aspect, a use of a dried precipitated calcium carbonate according to the present invention, preferably a dried powder of precipitated calcium carbonate, in plastics and/or polymer compositions is provided.

According to still another aspect, the use of a combination of at least one water-soluble polymer and at least one slaking additive in a process for producing an aqueous suspension of precipitated calcium carbonate is provided, wherein the water-soluble polymer has a molecular weight $M_w$ in the range from 200 to 6500 g/mol and has the chemical structure of formula (I)

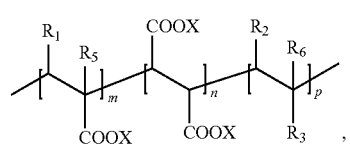
(I)

wherein n, m, and p are integers and at least one of n, m, or p is greater than zero and n+m+p is less than or equal to 70, $R_1$ is H or $CH_3$, $R_2$ is H or $CH_3$, $R_3$ is $-C(=O)-O-R_4$ or $-C(=O)-NH-R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, $R_5$ is H or $CH_3$, $R_6$ is H or $CH_3$, and X is H and/or M, wherein M is Na, K, Li, Mg, and/or Ca, and wherein the structural units

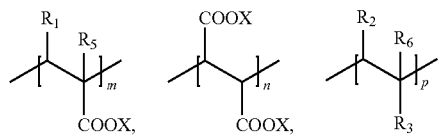

are arranged randomly, regularly and/or in blocks, and the slaking additive is selected from the group consisting of organic acids, organic acid salts, sugar alcohols, monosaccharides, disaccharides, polysaccharides, gluconates, phosphonates, lignosulfonates, and mixtures thereof.

Advantages embodiment of the present invention are defined in the corresponding sub-claims.

According to one embodiment the at least one polymer has the chemical structure of formula (II)

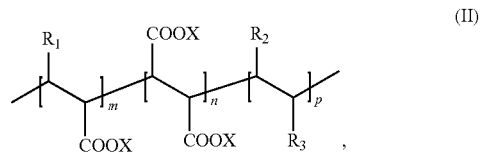
(II)

wherein n, m, and p are integers and at least one of n, m, or p is greater than zero and n+m+p is less than or equal to 70, $R_1$ is H or $CH_3$, $R_2$ is H or $CH_3$, $R_3$ is $-C(=O)-O-R_4$ or $-C(=O)-NH-R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, and X is H and/or M, wherein M is Na, K, Li, Mg, and/or Ca, and wherein the structural units

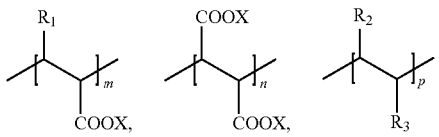

are arranged randomly, regularly and/or in blocks.

According to another embodiment the at least one polymer has the chemical structure of formula (I)

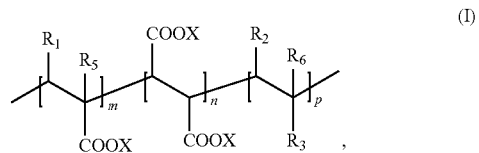

wherein n, m, and p are integers and at least one of n, m, or p is greater than zero and n+m+p is less than or equal to 70, $R_1$ is H $R_2$ is H or $CH_3$, $R_3$ is —C(═O)—O—$R_4$ or —C(═O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, $R_5$ is H, $R_6$ is H or $CH_3$, and X is H and/or M, wherein M is Na, K, Li, Mg, and/or Ca, and wherein the structural units

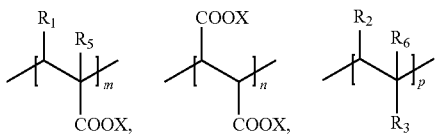

are arranged randomly, regularly and/or in blocks.

According to one embodiment step iv) comprises the steps of: a1) mixing the at least one polymer of step ii) and the at least one slaking additive of step iii) with water, and a2) adding the calcium oxide containing material of step i) to the mixture of step a1). According to another embodiment step iv) comprises the steps of: b1) mixing the calcium oxide containing material of step i), the at least one polymer of step ii), and the at least one slaking additive of step iii), and b2) adding water to the mixture of step b1).

According to still one embodiment of the inventive process, in step iv) the calcium oxide containing material of step i), the at least one polymer of step ii), the at least one slaking additive of step iii), and water are mixed simultaneously. According to another embodiment of the inventive process, in step iv) the calcium oxide containing material and the water are mixed in a weight ratio from 1:1 to 1:9, preferably from 1:2.5 to 1:6, and more preferably from 1:3 to 1:5.

According to one embodiment the at least one slaking additive is selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and mixtures thereof, preferably the slaking additive is sodium citrate and/or saccharose. According to another embodiment the milk of lime of step iv) has a Brookfield viscosity from 1 to 1000 mPa·s at 25° C., more preferably from 5 and 800 mPa·s at 25° C., and most preferably from 10 and 600 mPa·s at 25° C.

According to still one embodiment the suspension of PCC of step v) has a Brookfield viscosity of less than or equal to 1000 mPa·s at 25° C., more preferably less than or equal to 800 mPa·s at 25° C., and most preferably less than or equal to 600 mPa·s at 25° C. According to another embodiment the obtained suspension of precipitated calcium carbonate has a solids content of at least 20 wt.-%, preferably from 20 to 50 wt.-%, more preferably from 25 to 45 wt.-%, and most preferably from 30 to 40 wt.-%, based on the total weight of the suspension.

According to one embodiment the slaking additive is added in an amount from 0.01 to 2 wt.-%, based on the total amount of calcium oxide containing material, preferably in an amount from 0.05 to 1 wt.-%, more preferably from 0.06 to 0.8 wt.-%, and most preferably from 0.07 to 0.5 wt.-%. According to another embodiment the temperature of the water, which is used in mixing step iv), is adjusted to be in the range from more than 0° C. and less than 100° C., preferably from 1° C. to 70° C., more preferably from 2° C. to 50° C., even more preferably from 30° C. to 50° C., and most preferably from 35 to 45° C. According to still another embodiment the temperature of the milk of lime obtained from step iv), which is employed in step v), is adjusted to be in the range from 20° C. to 60° C., and preferably from 30° C. to 50° C. According to still another embodiment the milk of lime is screened after step iv) and before step v), preferably with a screen having a sieve size from 100 to 300 µm.

According to one embodiment the precipitated calcium carbonate is a dried precipitated calcium carbonate, preferably a dried powder of precipitated calcium carbonate, and the process further comprises a step vii) of drying the separated precipitated calcium carbonate obtained from step vi).

According to one embodiment, in formula (I) n and p are zero, $R_1$ is H, and X is Na; or m and p are zero, and X is Na; or n is zero, $R_1$ and $R_2$ are H, $R_3$ is —C(═O)—O—$CH_2CH_3$, and X is Na. According to another embodiment, in formula (I) the molar ratio between the structural units

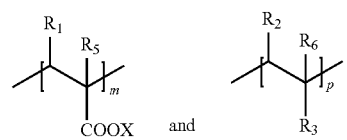

is between 1:1 and 100:1, and preferably from 1:10 and 50:1. According to still another embodiment the at least one water-soluble polymer has a polydispersity index of less than or equal to 3, preferably less than or equal to 2.5, and more preferably less than or equal to 2.

It should be understood that for the purpose of the present invention, the following terms have the following meaning:

A "calcium oxide containing material" in the meaning of the present invention can be a mineral or a synthetic material having a content of calcium oxide of at least 50 wt.-%, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example by a cyclone or classifier.

Throughout the present document, the "particle size" of precipitated calcium carbonate or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2 524 898 A1, EP 2 371 766 A1, or unpublished European patent application no. 12 164 041.1.

For the purpose of the present invention, the "solids content" of a liquid composition is a measure of the amount of material remaining after all the solvent or water has been evaporated.

Throughout the present document, the "polydispersity index" of a polymer is a measure of the broadness of a molecular weight distribution of a polymer. The polydispersity index (PDI) of a polymer is determined by dividing its weight average molecular weight ($M_w$) by its number average molecular weight ($M_n$), i.e. PDI=$M_w/M_n$. The weight average molecular weight ($M_w$) and the number average molecular weight ($M_n$) can be determined by gel permeation chromatography.

A "specific BET surface area" (SSA) in the meaning of the present invention is defined as the surface area of the precipitated calcium carbonate particles divided by the mass of PCC particles. As used therein the specific surface area is measured by adsorption using the BET isotherm (ISO 9277: 1995) and is specified in $m^2/g$.

In the meaning of the present invention, "stable in an aqueous suspension having a pH of 12 and a temperature of 95° C." means that the polymer maintains its physical properties and chemical structure when added to an aqueous suspension having a pH of 12 and a temperature of 95° C. For example, the polymer maintains its dispersing qualities and is not depolymerized or degraded under said conditions.

For the purpose of the present invention, the term "viscosity" or "Brookfield viscosity" refers to Brookfield viscosity. The Brookfield viscosity is for this purpose measured by a Brookfield (Typ RVT) viscometer at 25° C.±1° C. at 100 rpm using an appropriate spindle and is specified in mPa·s.

For the purpose of the present application, "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate.

A "suspension" or "slurry" in the meaning of the present invention comprises insoluble solids and water, and optionally further additives, and usually contains large amounts of solids and, thus, is more viscous and can be of higher density than the liquid from which it is formed.

Unless specified otherwise, the term "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

The "total moisture content" of a material refers to the percentage of moisture (i.e. water) which may be desorbed from a sample upon heating to 220° C.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive process for producing an aqueous suspension of precipitated calcium carbonate comprises the steps of (i) providing a calcium oxide containing material, (ii) providing at least one water-soluble polymer, (iii) providing at least one slaking additive, (iv) preparing a milk of lime by mixing water, the calcium oxide containing material of step (i), the at least one polymer of step (ii), and the at least one slaking additive of step (iii), and (v) carbonating the milk of lime obtained from step (iv) to form an aqueous suspension of precipitated calcium carbonate. The at least one polymer has a molecular weight $M_w$ in the range from 200 to 6500 g/mol and has the chemical structure of formula (I). The at least one slaking additive is selected from the group consisting of organic acids, organic acid salts, sugar alcohols, monosaccharides, disaccharides, polysaccharides, gluconates, phosphonates, lignosulfonates, and mixtures thereof. In process step (iv), the calcium oxide containing material and the water are mixed in a weight ratio from 1:1 to 1:12.

In the following details and preferred embodiments of the inventive process will be set out in more details. It is to be understood that these technical details and embodiments also apply to the inventive use as well as to the inventive products and their use.

Process Step i)

In step i) of the process of the present invention, a calcium oxide containing material is provided.

The calcium oxide containing material of step i) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates; natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcinations process in order to obtain a calcium oxide containing material.

Calcium carbonate decomposes at about 1000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step i) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 75 wt.-%, preferably at least 90 wt.-%, and most preferably 95 wt.-%, based on the total weight of the calcium oxide containing material. According to one embodiment, the calcium oxide containing material consists of calcium oxide.

The calcium oxide containing material can consist of only one type of calcium oxide containing material. Alternatively, the calcium oxide containing material can consist of a mixture of two or more types of calcium oxide containing materials.

The calcium oxide containing material can be used in the inventive process in its original form, i.e. as a raw material, for example, in form of smaller and bigger chunks. Alternatively, the calcium oxide containing material can be ground before use. According to one embodiment of the present invention, the calcium carbonate containing material is in forms of particles having weight median particle size $d_{50}$ from 0.1 to 1000 µm, and preferably from 1 to 500 µm.

Process Step ii)

In step ii) of the process of the present invention, at least one water-soluble polymer is provided, wherein the at least one water-soluble polymer has a molecular weight $M_w$ in the range from 200 to 6500 g/mol and the chemical structure of formula (I)

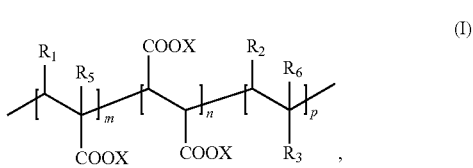

wherein n, m, and p are integers and at least one of n, m, or p is greater than zero and n+m+p is less than or equal to 70, $R_1$ is H or $CH_3$,
$R_2$ is H or $CH_3$,
$R_3$ is —C(=O)—O—$R_4$ or —C(=O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other,
$R_5$ is H or $CH_3$,
$R_6$ is H or $CH_3$, and
X is H and/or M, wherein M is Na, K, Li, Mg, and/or Ca, and wherein the structural units

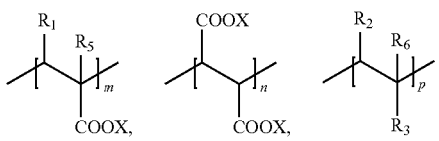

are arranged randomly, regularly and/or in blocks.

According to one embodiment, the alkyl group is a $C_1$ to $C_{15}$ alkyl group, preferably a $C_1$ to $C_{10}$ alkyl group, more preferably a $C_1$ to $C_6$ alkyl group, and most preferably a $C_1$ to $C_4$ alkyl group. Examples of suitable alkyl groups are methyl, ethyl, n-propyl, isopropyl, n-butyl, sec.-butyl, tert.-butyl, isobutyl, n-pentyl, n-hexyl, heptyl, or octyl.

According to one embodiment, the cycloalkyl group is a $C_3$ to $C_{15}$ cycloalkyl group, preferably a $C_3$ to $C_{10}$ cycloalkyl group, and more preferably a $C_3$ to $C_6$ cycloalkyl group. Examples of suitable cycloalkyl groups are cyclopropyl, cyclobutyl, cyclopentyl, cyclohexyl, cycloheptyl, or cyclooctyl. The cycloalkyl group can comprise only one ring or several rings being linked to each other, for example, by a single bond or one or more alkyl groups. The rings may be linked in a linear or branched way. Examples of cycloalkyl groups comprising several rings are dicyclohexyl or tricyclohexyl.

According to one embodiment, the aryl group is a $C_6$ to $C_{20}$ aryl group, preferably a $C_6$ to $C_{15}$ aryl group, and more preferably a $C_6$ to $C_{10}$ aryl group. Examples of suitable aryl groups are phenyl, naphtyl, anthracenyl, azulenyl, or cyclopentadienyl. The aryl group can comprise only one ring or several rings being linked to each other, for example, by a single bond or one or more alkyl groups. The rings may be linked in a linear or branched way. Preferably, $R_4$ represents one or several phenyl groups being linked to each other, optionally being substituted by one or more alkyl, e.g. methyl, ethyl or butyl groups. $R_4$ preferably represents a tristyrylphenyl or a distyrylphenyl group.

According to an optional embodiment of the present invention, the $C_1$ to $C_{20}$ alkyl group, the $C_3$ to $C_{20}$ cycloalkyl group and/or the $C_6$ to $C_{30}$ aryl group are substituted with one or more sulfonate groups. The sulfonate groups may be present in protonated or deprotonated form.

According to one embodiment of the present invention, $R_4$ is methyl, ethyl, propyl, butyl, isobutyl, pentyl, or hexyl. Preferably, $R_4$ is methyl, ethyl or tert-butyl, being optionally substituted with one or more sulfonate groups.

According to one embodiment of the present invention, $R_1$ is H. According to another embodiment of the present invention, $R_2$ is H. According to still another embodiment of the present invention, $R_1$ and $R_2$ are H.

According to one embodiment, X is Na. According to this embodiment, 100 mol-% of the polymer are neutralized with Na. According to another embodiment, X is H and Na.

According to this embodiment, the polymer is partially neutralized with Na. For example, between 10 and 90 mol-% of the polymer can be neutralized with Na, and preferably between 20 and 80 mol-%.

According to one embodiment of the present invention, $R_5$ is H. According to another embodiment of the present invention, $R_6$ is H. According to still another embodiment of the present invention, $R_5$ and $R_6$ are H.

According to one embodiment the at least one polymer has the chemical structure of formula (II)

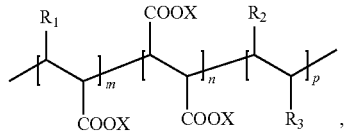
(II)

wherein n, m, and p are integers and at least one of n, m, or p is greater than zero and n+m+p is less than or equal to 70, $R_1$ is H or $CH_3$, $R_2$ is H or $CH_3$, $R_3$ is —C(=O)—O—$R_4$ or —C(=O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, and X is H and/or M, wherein M is Na, K, Li, Mg, and/or Ca, and wherein the structural units

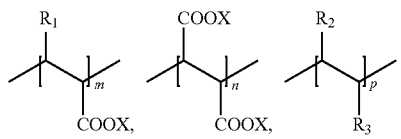

are arranged randomly, regularly and/or in blocks.

According to another embodiment, $R_1$ is H and $R_5$ is H. Thus, the at least one polymer has chemical structure of formula (I)

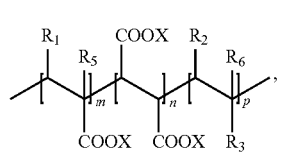
(I)

wherein n, m, and p are integers and at least one of n, m, or p is greater than zero and n+m+p is less than or equal to 70, $R_1$ is H $R_2$ is H or $CH_3$, $R_3$ is —C(=O)—O—$R_4$ or —C(=O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, $R_5$ is H, $R_6$ is H or $CH_3$, and X is H and/or M, wherein M is Na, K, Li, Mg, and/or Ca, and wherein the structural units

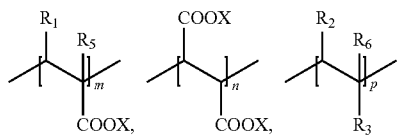

are arranged randomly, regularly and/or in blocks.

According to one embodiment of the present invention $R_1$ is H, $R_2$ is H, $R_5$ is $CH_3$, and $R_6$ is $CH_3$. Thus, the at least one polymer has the chemical structure of formula (III)

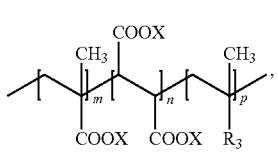
(III)

wherein n, m, and p are integers and at least one of n, m, or p is greater than zero and n+m+p is less than or equal to 70, $R_3$ is —C(=O)—O—$R_4$ or —C(=O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, and X is H and/or M, wherein M is Na, K, Li, Mg, and/or Ca, and wherein the structural units

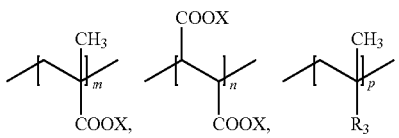

are arranged randomly, regularly and/or in blocks.

According to one embodiment, m is less than or equal to 45. According to another embodiment, n and/or p is less than or equal to 10.

According to one embodiment of the present invention, n and p are zero, $R_1$ is H, and X is Na. According to another embodiment of the present invention, m and p are zero, and X is Na. According to still another embodiment, n is zero, $R_1$ and $R_2$ are H, $R_3$ is —C(=O)—O—CH$_2$CH$_3$, and X is Na.

According to one embodiment of the present invention, the molar ratio between the structural units

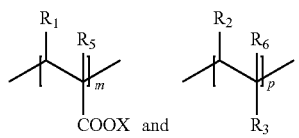

is between 1:1 and 100:1, preferably between 1:10 and 50:1.

According to another embodiment of the present invention, the at least one polymer has structural formula (II) and the molar ratio between the structural units

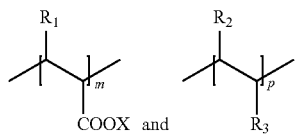

is between 1:1 and 100:1, preferably between 1:10 and 50:1.

The at least one water-soluble polymer of the present invention, can be partially or totally neutralized. According to one embodiment, the at least one water-soluble polymer is partially or totally neutralized by at least one neutralization agent having a monovalent or polyvalent cation. The at least one neutralization agent can be selected from the group consisting of ammonia, calcium hydroxide, calcium oxide, sodium hydroxide, sodium oxide, magnesium hydroxide, magnesium oxide, potassium hydroxide, potassium oxide, lithium hydroxide, lithium oxide, an aliphatic secondary amine, a cyclic, secondary amine, an aliphatic, cyclic secondary amine, an aliphatic tertiary amine, a cyclic tertiary amine, and an aliphatic, cyclic tertiary amine or tertiary amines, and mixture thereof.

According to one embodiment of the present invention, the at least one water-soluble polymer has a polydispersity index of less than or equal to 3, preferably less than or equal to 2.5, and more preferably less than or equal to 2.

According to one embodiment of the present invention, the at least one water-soluble polymer of formula (I) comprises a polyacrylic acid, a polyacrylate, a poly(meth)acrylic acid and/or poly(meth)acrylate. Said polymers may be partially or totally neutralized by at least one neutralization agent having a monovalent or polyvalent cation. The at least one neutralization agent can be selected from the group of materials described above. According to one embodiment of the present invention, the at least one water-soluble polymer of formula (I) is a polyacrylate and/or poly(meth)acrylate, preferably at least partially neutralized by one or more monovalent and/or polyvalent cations. According to a preferred embodiment the monovalent and/or polyvalent cations are selected from Li$^+$, Na$^+$, K$^+$, Sr$^{2+}$, Ca$^{2+}$, Mg$^{2+}$, or mixtures thereof.

The water-soluble polymer used in the process of the present invention can be obtained by methods of radical polymerisation in solution, in a direct or reverse emulsion, in suspension or precipitation in solvents, in the presence of catalytic systems and chain transfer agents, or again by methods of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

The at least one water-soluble polymer used according to the present invention may be derivable from one or more of the following monomers: acrylic acid, methacrylic acid, 3-methyl-2-propenoic acid, 2, 3-dimethyl-2-propenoic acid, maleic acid, a salt of acrylic acid, a salt of methacrylic acid, a salt of 3-methyl-2-propenoic acid, a salt of 2, 3-dimethyl-2-propenoic acid, a salt of maleic acid, maleic anhydride, N-substituted acrylamide, acrylic acid esters, N-substituted methacrylamide, methacrylic acid esters, N-substituted 3-methyl-2-propenamide, N-substituted 2, 3-dimethyl-2-propenamide, 3-methyl-2-propenoic acid ester, 2, 3-dimethyl-2-propenoic acid ester and/or 2-acrylamido-2-methylpropane sulfonic acid (AMPS).

According to the present invention, the at least one polymer defined above is added during step iv) of the inventive process for producing PCC, i.e. the polymer is added during the slaking step. As known to the skilled person, the milk of lime obtained by slaking a calcium oxide containing material with water has usually a pH value between 11 and 12.5 at a temperature of 25° C., depending on the concentration of the calcium oxide containing material in the milk of lime. Since the slaking reaction is exothermic, the temperature of the milk of lime typically raises to a temperature between 80 and 99° C. According to one embodiment of the present invention, the at least one polymer of step ii) is selected such that it is stable in an aqueous suspension having a pH of 12 and a temperature of 95° C. In the meaning of the present invention, "stable in an aqueous suspension having a pH of 12 and a temperature of 95° C." means that the polymer maintains its physical properties and chemical structure when added to an aqueous suspension having a pH of 12 and a temperature of 95° C. For example, the polymer maintains its dispersing qualities and is not depolymerized or degraded under said conditions. The absence of any depolymerization or degradation of the polymer may be determined by measuring the amount of free monomers in the milk of lime and/or the obtained aqueous PCC suspension. According to one embodiment of the present invention, the amount of free monomers in the milk of lime is below 0.1 wt.-%, preferably below 0.05 wt.-%, more preferably below 0.01 wt.-%, and most preferably below 0.005 wt.-%, based on the total amount of the at least one polymer provided in step ii).

According to one embodiment of the present invention, the at least one water-soluble polymer is in its neutralized or partially neutralized form.

According to one embodiment of the present invention, the at least one polymer of step ii) has a molecular weight $M_w$ in the range from 500 to 6000, preferably from 1000 to 6000 g/mol, and more preferably from 1500 to 5000 g/mol. The molecular weight $M_w$ may be determined by gel permeation chromatography.

According to one embodiment of the present invention, the at least one polymer of step ii) consists of one type of polymer only. Alternatively, the at least one polymer of step ii) can consist of a mixture of two or more types of polymers.

According to one embodiment of the present invention, the at least one polymer of step ii) is added in an amount from 0.01 to 0.5 wt.-%, preferably from 0.02 to 0.4 wt.-%, and more preferably from 0.05 to 0.35 wt.-%, based on the total weight of the calcium oxide containing material.

The at least one polymer of step ii) can be provided in form of a solution or as a dry material. According to one embodiment, the at least one polymer of step ii) is provided in form of a solution. According to another embodiment of the present invention, the at least one polymer of step ii) is provided in form of an aqueous solution having a polymer concentration from 1 to 70 wt.-%, and preferably from 2 to 60 wt.-%, based on the total weight of the aqueous solution.

Process Step iii)

In step iii) of the process of the present invention, at least one slaking additive is provided, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof.

According to one embodiment of the present invention, the at least one slaking additive is selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and mixtures thereof. According to a preferred embodiment, the at least one slaking additive is sodium citrate and/or saccharose.

According to one embodiment of the present invention, the at least one slaking additive of step iii) consists of one type of slaking additive only. Alternatively, the at least one slaking additive of step iii) can consist of a mixture of two or more types of slaking additives.

The at least one slaking additive may be provided in an amount from 0.01 to 0.2 wt.-%, based on the total amount of calcium oxide containing material, preferably in an amount from 0.05 to 1 wt.-%, more preferably from 0.06 to 0.8 wt.-%, and most preferably from 0.07 to 0.5 wt.-%.

By adding a slaking additive, the size of the PCC particles and their crystal morphology can be controlled without affecting the viscosity of the aqueous suspension.

Process Step iv)

In step iv) of the process of the present invention, a milk of lime is prepared by mixing water, the calcium oxide containing material of step i), the at least one polymer of step ii), and the at least one slaking additive of step iii), wherein the calcium oxide containing material and the water are mixed in a weight ratio from 1:1 to 1:12.

The reaction of the calcium oxide containing material with water results in the formation of a milky calcium hydroxide suspension, better known as milk of lime. Said reaction is highly exothermic and is also designated as "lime slaking" in the art.

According to one embodiment of the present invention, the temperature of the water, which is used in mixing step iv), i.e. the temperature of the water that is used to slake the calcium oxide containing material, is adjusted to be in the range from more than 0° C. and less than 100° C. In other words, the water that is used to slake the calcium oxide containing material is adjusted to a temperature range, in which the water is in liquid form. Preferably, the temperature of the water, which is employed in mixing step iv) is adjusted to be from 1° C. to 70° C., more preferably from 2° C. to 50° C., even more preferably from 30° C. to 50° C., and most preferably from 35 to 45° C. It will be apparent to the skilled person that the initial temperature of the water is not necessarily the same one as the temperature of the mixture prepared in step iv) due to the highly exothermic slaking reaction and/or due to the mixing of substances having different temperatures.

According to one embodiment of the present invention, process step iv) comprises the steps of:
a1) mixing the at least one polymer of step ii) and the at least one slaking additive of step iii) with water, and
a2) adding the calcium oxide containing material of step i) to the mixture of step a1).

According to one embodiment, step a1) is carried out at a temperature from more than 0° C. to 99° C., preferably from 1° C. to 70° C., more preferably from 2° C. to 50° C., even more preferably from 30° C. to 50° C., and most preferably from 35 to 45° C.

According to another embodiment of the present invention, process step iv) comprises the steps of:
b1) mixing the calcium oxide containing material of step i), the at least one polymer of step ii), and the at least one slaking additive of step iii), and b2) adding water to the mixture of step b1).

According to still another embodiment of the present invention, in process step iv) the calcium oxide containing material of step i), the at least one polymer of step ii), the at least one slaking additive of step iii), and water are mixed simultaneously.

According to still another embodiment of the present invention, the at least one slaking additive is added before or after step iv) of the inventive process.

The at least one polymer of step ii) may be added in step iv) in one portion or in several portions. According to one embodiment, in step iv) the at least one polymer of step ii) is mixed with the water, the calcium oxide containing material of step i), and the at least one slaking additive of step iii) by adding the at least one polymer in one portion or in two, three, four, five, or more portions.

Process step iv) may be performed at room temperature, i.e. at a temperature of 20° C.±2° C., or at an initial temperature of 30 to 50°, preferably 35 to 45° C. Since the reaction is exothermic, the temperature typically raises to a temperature between 85 and 99° C. during step iv), preferably to a temperature between 90 and 95° C. According to a preferred embodiment, process step iv) is performed with mixing, agitation, or stirring, for example, mechanical stirring. Suitable process equipment for mixing, agitation or stirring is known to the skilled person.

The progress of the slaking reaction may be observed by measuring the temperature and/or conductivity of the reaction mixture. It can also be monitored by turbidity control. Alternatively or additionally, the progress of the slaking reaction can be inspected visually.

Conventional methods for preparing PCC suffer from the problem that the milk of lime can only be processed at low solids content since the milk of lime becomes very viscous at higher solids content during the slaking process. In a typical PCC production process of the prior art, the weight ratio of calcium oxide to water is less than 1:6, usually 1:9 or 1:10. The inventors surprisingly found that the addition of a combination of a polymer as defined above and a slaking additive as defined above, before or during the slaking step of a process for producing PCC can allow the preparation of a milk of lime with a high solids content. By carbonating said highly concentrated milk of lime, an aqueous suspension of PCC can be obtained which has also a high solids content. As a result, the process of the present invention does not require an additional up-concentration step in order to obtain a PCC suspension with a high solids content.

According to the present invention, the calcium oxide containing material and the water are mixed in a weight ratio from 1:1 to 1:12. According to one preferred embodiment, in step iv) the calcium oxide containing material and the water are mixed in a weight ratio from 1:1 to 1:9, preferably from 1:2.5 to 1:6, and more preferably from 1:3 to 1:5.

According to one embodiment of the present invention, the milk of lime of step iv) has a solids content of at least 15 wt.-%, preferably from 15 to 45 wt.-%, more preferably from 20 to 40 wt.-%, and most preferably from 25 to 37 wt.-%, based on the total weight of the milk of lime.

According to one embodiment of the present invention, the milk of lime of step iv) has a Brookfield viscosity from 1 to 1000 mPa·s at 25° C., more preferably from 5 and 800 mPa·s at 25° C., and most preferably from 10 and 500 mPa·s at 25° C. According to one embodiment, the Brookfield viscosity is measured at 100 rpm.

It is within the confines of the present invention that additional water may be introduced during the slaking reaction in order to control and/or maintain and/or achieve the desired solids content or Brookfield viscosity of the milk of lime.

Process step iv) can be carried out in form of a batch process, a semi-continuous or a continuous process. FIG. 1 shows an example of a continuous process step iv). The at least on polymer (2), the slaking additive (3), water (4), and a calcium oxide containing material (5) are fed into a slaker (1). The reaction heat (6) resulting from the exothermic slaking reaction is dissipated and the obtained milk of lime is discharged (7) to the next process stage, for example, the carbonation stage or a screening stage.

Process Step (v)

In step v) of the process of the present invention, the milk of lime obtained from step iv) is carbonated to form an aqueous suspension of precipitated calcium carbonate.

The carbonation is carried out by means and under conditions well-known by the person skilled in the art. The introduction of carbon dioxide into the milk of lime quickly increases the carbonate ion ($CO_3^{2-}$) concentration and calcium carbonate is formed. Particularly, the carbonation reaction can be readily controlled considering the reactions involved in the carbonation process. Carbon dioxide dissolves according to its partial pressure forming carbonate ions via the formation of carbonic acid ($H_2CO_3$), and hydrogen carbonate ions ($HCO_3^-$) being unstable in the alkaline solution. Upon continued dissolution of carbon dioxide, hydroxide ions are consumed and the concentration of carbonate ions increases until the concentration of dissolved calcium carbonate exceeds the solubility product and solid calcium carbonate precipitates.

According to one embodiment of the present invention, in step v) the carbonation is carried out by feeding pure gaseous carbon dioxide or technical gases containing at least 10 vol.-% of carbon dioxide into the milk of lime.

The progress of the carbonation reaction can be readily observed by measuring the conductivity density, turbidity and/or pH. In this respect, the pH of the milk of lime before addition of carbon dioxide will be more than 10, usually between 11 and 12.5, and will constantly decrease until a pH of about 7 is reached. At this point the reaction can be stopped.

Conductivity slowly decreases during the carbonation reaction and rapidly decreases to low levels, when the precipitation is completed. The progress of the carbonation may be monitored by measuring the pH and/or the conductivity of the reaction mixture.

According to one embodiment of the present invention, the temperature of the milk of lime obtained from step iv), which is used in step v) is adjusted to be in the range from 20° C. to 60° C., and preferably from 30° C. to 50° C. It will be apparent to the skilled person that the initial temperature of the milk of lime, is not necessarily the same one as the temperature of the mixture prepared in step v) due to the exothermic carbonation reaction and/or due to the mixing of substances having different temperatures.

According to one embodiment of the present invention, step v) is carried out at a temperature from 5 to 95° C., preferably from 30 to 70° C., and more preferably from 40 to 60° C.

Process step v) can be carried out in form of a batch process, a semi-continuous or a continuous process. According to one embodiment, the process of the present invention involving the process steps i) to v) is carried out in form of a batch process, a semi-continuous or a continuous process.

According to one embodiment of the present invention, the process of the present invention does not comprise a step of up-concentrating the aqueous suspension of precipitated calcium carbonate obtained by steps i) to v) of the inventive process.

As already mentioned above, the inventors surprisingly found that the addition of a polymer as defined above in combination with the addition of a slaking additive before or during the slaking step of a process for producing PCC can allow the preparation of a PCC suspension with a high solids content. It is also believed that the omission of an up-concentration step improves the quality of the produced PCC particles, since surface damages of the particles, which can occur during the up-concentration step, are avoided. It was also found that said PCC suspension can be further up-concentrated to a solids contents of above 52 wt % at acceptable viscosities, for example, to Brookfield viscosities of less than or equal to 1000 mPa·s at 25° C. and 100 rpm. Typically, this cannot be done with PCC suspensions that are obtained by conventional PCC production processes including a up-concentrating step because the viscosity of said suspension would raise to a non-pumpable range.

According to one embodiment of the present invention, the obtained precipitated calcium carbonate has a weight median particle size $d_{50}$ from 0.1 to 100 μm, preferably from 0.25 to 50 μm, more preferably from 0.3 to 5 μm, and most preferably from 0.4 to 3.0 μm.

The precipitated calcium carbonate may have aragonitic, calcitic, or vateritic crystal structure, or mixtures thereof. It is a further advantage of the present invention that the crystal structure and morphology of the precipitated calcium carbonate can be controlled, e.g. by addition of seed crystals or other structure modifying chemicals. According to a preferred embodiment, the precipitated calcium carbonate obtained by the inventive process has a clustered scalenohedral crystal structure.

The BET specific surface area of the precipitated calcium carbonate obtained by the process according to the present invention may be from 1 to 100 $m^2/g$, preferably from 2 to 70 m²/g, more preferably from 3 to 50 m²/g, especially from 4 to 30 m²/g, measured using nitrogen and the BET method according to ISO 9277. The BET specific surface area of the precipitated calcium carbonate obtained by the process of the present invention may be controlled by the use of additives, e.g. surface active agents, shearing during the precipitation step or thereafter at high mechanical shearing rates not only leading to a low particle size, but also to a high BET specific surface area.

According to one embodiment of the present invention, the obtained suspension of precipitated calcium carbonate has a solids content of at least 20 wt.-%, preferably from 20 to 50 wt.-%, more preferably from 25 to 45 wt.-%, and most preferably from 30 to 40 wt.-%, based on the total weight of the suspension.

According to one embodiment of the present invention, the suspension of PCC of step v) has a Brookfield viscosity of less than or equal to 1000 mPa·s at 25° C., more preferably less than or equal to 800 mPa·s at 25° C., and most preferably less than or equal to 600 mPa·s at 25° C. The Brookfield viscosity may be measured at 100 rpm.

According to a further aspect of the present invention, the use of a combination of at least one water-soluble polymer and a slaking additive in a process for producing an aqueous suspension of precipitated calcium carbonate is provided, wherein the at least one water-soluble polymer has a molecular weight M in the range from 200 to 6500 g/mol, and has the chemical structure of formula (I), and the slaking additive is selected from the group consisting of organic acids, organic acid salts, sugar alcohols, monosaccharides, disaccharides, polysaccharides, gluconates, phosphonates, lignosulfonates, and mixtures thereof.

Additional Process Steps

The process of the present invention can comprise additional process steps.

The milk of lime may be screened in order to remove oversize particles. A suitable screen can include, for example, a screen having a sieve size from 700 to 100 μm, for example, about 100 or about 300 μm. According to one embodiment of the present invention, the milk of lime is screened after step iv) and before step v), preferably with a screen having a sieve size from 100 to 300 μm.

According to a further aspect of the present invention, a process for producing precipitated calcium carbonate is provided, the process comprising the steps of:
i) providing a calcium oxide containing material,
ii) providing at least one water-soluble polymer having a molecular weight NI, in the range from 200 to 6500 g/mol, wherein the at least one polymer has the chemical structure of formula (I),
iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof,
iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12,
v) carbonating the milk of lime obtained from step iv) to form an aqueous suspension of precipitated calcium carbonate, and
vi) separating the precipitated calcium carbonate from the aqueous suspension obtained from step v).

For the purpose of the present invention, the expression "separating" means that the PCC is removed or isolated from the aqueous suspension obtained from step v) of the inventive process. The precipitated calcium carbonate obtained from step v) may be separated from the mother liquor by any conventional means of separation known to the skilled person. According to one embodiment of the present invention, in process step vi) the PCC is separated mechanically and/or thermally. Examples for mechanical separation processes are filtration, e.g. by means of a drum filter or filter press, nanofiltration, or centrifugation. An example for a thermal separation process is an up-concentration process by the application of heat, for example, in an evaporator. According to a preferred embodiment, in process step vi) the PCC is separated mechanically, preferably by filtration and/or centrifugation.

It is also preferred that the mother liquor obtained after precipitation and/or any one of the reactants may be recycled into the process.

The obtained PCC may be further processed, e.g., may be deagglomerated or subjected to a dry grinding step. Otherwise, it may also be wet ground in form of a suspension. If the PCC is subjected to dewatering, dispersion and/or grinding steps, these steps may be accomplished by procedures known in the art. Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Dispersants also can be included to prepare dispersions if desired.

According to still a further aspect of the present invention, a process for producing dried precipitated calcium carbonate is provided, the process comprising the steps of:
i) providing a calcium oxide containing material,
ii) providing at least one water-soluble polymer having a molecular weight $M_w$ in the range from 200 to 6500 g/mol, wherein the at least one polymer has the chemical structure of formula (I),
iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof,
iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12,
v) carbonating the milk of lime obtained from step iv) to form an aqueous suspension of precipitated calcium carbonate,
vi) separating the precipitated calcium carbonate from the aqueous suspension obtained from step v), and
vii) drying the separated precipitated calcium carbonate obtained from step vi).

In general, the drying step vii) may take place using any suitable drying equipment and can, for example, include thermal drying and/or drying at reduced pressure using equipment such as an evaporator, a flash drier, an oven, a spray drier and/or drying in a vacuum chamber.

According to one embodiment, drying step vii) is a spray drying step, preferably said spray drying step is carried out at a lower temperature ranging from 90° C. to 130° C. and preferably from 100° C. to 120° C. By means of drying step vii), a dried precipitated calcium carbonate is obtained having a low total moisture content which is less than or equal to 1.0 wt.-%, based on the total weight of the dried precipitated calcium carbonate.

According to another embodiment, the dried PCC of step vii) has a total moisture content of less than or equal to 0.5 wt.-% and preferably less than or equal to 0.2 wt.-%, based on the total weight of the dried precipitated calcium carbonate. According to still another embodiment, the dried PCC of step vii) has a total moisture content of between 0.01 and 0.15 wt.-%, preferably between 0.02 and 0.10 wt.-%, and more preferably between 0.03 and 0.07 wt.-%, based on the total weight of the dried precipitated calcium carbonate.

The precipitated calcium carbonate obtained by the inventive process can be post-treated, for example, during and/or after a drying step with an additional component. According to one embodiment the precipitated calcium carbonate is treated with a fatty acid, e.g. stearic acid, a silane, or phosphoric esters of fatty acids.

Products and their Use

According to the present invention, an aqueous suspension of precipitated calcium carbonate is provided, which is obtainable by a process comprising the steps of:
i) providing a calcium oxide containing material,
ii) providing at least one water-soluble polymer having a molecular weight $M_w$ in the range from 200 to 6500 g/mol, wherein the at least one polymer has the chemical structure of formula (I),
iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof,
iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12, and
v) carbonating the milk of lime obtained from step iv) to form an aqueous suspension of precipitated calcium carbonate.

According to a further aspect of the present invention, a precipitated calcium carbonate is provided, which is obtainable by a process comprising the steps of:
i) providing a calcium oxide containing material,
ii) providing at least one water-soluble polymer having a molecular weight $M_w$ in the range from 200 to 6500 g/mol, wherein the at least one polymer has the chemical structure of formula (I),
iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof,
iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12,
v) carbonating the milk of lime obtained from step iv) to form an aqueous suspension of precipitated calcium carbonate, and
vi) separating the precipitated calcium carbonate from the aqueous suspension obtained from step v).

The PCC suspension and/or PCC obtained by the process of the present invention may be used in various materials. According to one embodiment of the present invention, the precipitated calcium carbonate according to the present invention is used in paper, plastics, polymer compositions, paint, coatings, concrete, cosmetics, pharmaceutics and/or agriculture applications. According to another embodiment of the present invention, the aqueous suspension of precipitated calcium carbonate according to the present invention is used in paper, plastics, polymer compositions, paint, coatings, concrete, cosmetics, pharmaceutics and/or agriculture applications.

According to one aspect of the present invention, a product comprising the precipitated calcium carbonate according to the present invention is provided. According to a preferred embodiment, the product is a paper, a paper product, an ink, a paint, a coating, a plastic, a polymer composition, an adhesive, a building product, a foodstuff, an agricultural product, a cosmetic product or a pharmaceutical product.

According to still a further aspect of the present invention, a dried precipitated calcium carbonate is provided, which is obtainable by a process comprising the steps of:
i) providing a calcium oxide containing material,
ii) providing at least one water-soluble polymer having a molecular weight $M_w$ in the range from 200 to 6500 g/mol, wherein the at least one polymer has the chemical structure of formula (I),
iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof,
iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12,
v) carbonating the milk of lime obtained from step iv) to form an aqueous suspension of precipitated calcium carbonate,
vi) separating the precipitated calcium carbonate from the aqueous suspension obtained from step v), and
vii) drying the separated precipitated calcium carbonate obtained from step vi).

According to a preferred embodiment, the dried precipitated calcium carbonate obtainable from process steps i) to vii) is a dried powder of precipitated calcium carbonate.

The dried PCC obtainable from process steps i) to vii) may be used in paper, plastics, polymer compositions, paint, coatings, concrete, cosmetics, pharmaceutics and/or agriculture applications. According to a preferred embodiment, the dried precipitated calcium carbonate is used in plastics and/or polymer compositions. For example, said PCC may be used in thermoplastic polymers, such as polyvinyl chloride, polyolefins, and polystyrene. Moreover, the dried PCC may also be used in polymer coatings which may be applied on the surface of polymer articles, such as foils, in order to increase the hydrophobicity (e.g., reflected by an increased contact angle measured against water) of said surface.

According to one aspect of the present invention, a product comprising dried precipitated calcium carbonate according to the present invention, preferably a dried powder of said precipitated calcium carbonate, is provided.

According to one embodiment, the product is a paper, a paper product, an ink, a paint, a coating, a plastic, a polymer composition, an adhesive, a building product, a foodstuff, an agricultural product, a cosmetic product or a pharmaceutical product. According to a preferred embodiment, a product comprising a dried precipitated calcium carbonate is provided, wherein the product is a plastic or a polymer composition.

The scope and interest of the present invention will be better understood based on the following FIGURES and examples which are intended to illustrate certain embodiments of the present invention and are non-limitative.

DESCRIPTION OF THE FIGURE

FIG. 1 is a sketch of a continuous slaking process.

EXAMPLES

1. Measurement Methods

In the following, measurement methods implemented in the examples are described.

Brookfield Viscosity

The Brookfield viscosity of the liquid coating compositions was measured after one hour of production and after one minute of stirring at 25° C.±1° C. at 100 rpm by the use of a Brookfield viscometer type RVT equipped with an appropriate disc spindle, for example spindle 2 to 5.

pH Value

The pH of a suspension or solution was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Sigma-Aldrich Corp., USA). The reported pH values are the endpoint values detected by the instrument (the endpoint was when the measured signal differed by less than 0.1 mV from the average over the last 6 seconds).

Particle Size Distribution

The particle size distribution of the prepared PCC particles was measured using a Sedigraph 5100 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

Specific Carbonation Time

The monitoring of the conductivity, which slowly decreases during the carbonation reaction and rapidly decreases to a minimal level, thereby indicating the end of the reaction, was used to assess the time needed to perform the complete precipitation. The specific carbonation time (min/kg $Ca(OH)_2$) was determined by the following formula:

$$\text{Specific carbonation time} = \frac{10^5 \cdot Tf}{M \cdot SC_{MoL}}$$

wherein:
Tf (min) is the time needed to complete the carbonation of the milk of lime, as determined by monitoring the conductivity,
M (g) is the weight of the milk of lime introduced into the carbonation reactor, and
$SC_{MoL}$ (%) is the weight solids content of the milk of lime.

Molecular Weight $M_w$

The molecular weight of the polymers was determined by Gel Permeation Chromatography (GPC), wherein a liquid chromatography device equipped with a refractometric concentration detector, was used (Waters Corporation, USA).

Said liquid chromatography equipment was fitted with a steric exclusion column appropriately chosen in order to separate the different molecular weights of the analysed polymers. The liquid elution phase was an aqueous phase, which was adjusted to pH 9.00 using 1 N sodium hydroxide and contained 0.05 M of $NaHCO_3$, 0.1 M of $NaNO_3$, 0.02 M of triethanolamine, and 0.03% of $NaN_3$.

In a first step, the polymerisation solution was diluted to a concentration of 0.9 wt.-% in the GPC solubilisation solvent, which corresponds to the GPC's liquid elution phase, to which 0.04% of dimethylformamide was added as a flow marker or internal standard. A 0.2 µm filter was then applied, and subsequently 100 µl were injected into the chromatography device (eluent: an aqueous phase, which was adjusted to pH 9.00 with 1 N sodium hydroxide and contained 0.05 M of $NaHCO_3$, 0.1 M of $NaNO_3$, 0.02 M of triethanolamine, and 0.03% of $NaN_3$).

The liquid chromatography device contained an isocratic pump (Waters 515 HPLC pump, Waters Corporation, USA), the flow rate of which was set to 0.8 ml/min. The chromatography device also included an oven, which itself included the following system of columns, in series: a pre-column (guard column ultrahydrogel, Waters Corporation, USA) having a length of 6 cm and an internal diameter of 40 mm, and a linear column (ultrahydrogel, Waters Corporation, USA), having a length of 30 cm, and an internal diameter of 7.8 mm. The detection system, in turn, consisted of a refractometric detector (Waters 410 ri refractometric detector, Waters Corporation, USA). The oven was heated to a temperature of 60° C. and the refractometer was heated to a temperature of 45° C.

The chromatography device was calibrated by standards of powdered sodium polyacrylate of different molecular weights, certified for the supplier: Polymer Standard Service or American Polymer Standards Corporation.

Polydispersity Index (DPI)

The polydispersity index of a polymer is the ratio of the mass-average molecular weight in weight $M_w$ to the number-average molecular weight $M_n$. Both $M_w$ and $M_w$ were determined by gel permeation chromatography.

2. Polymers and Slaking Additives

The following polymers were used in the processes for producing PCC described in examples 1 to 6:

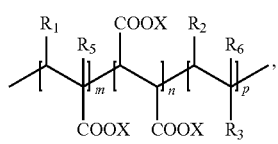
(I)

wherein $R_5$=H and $R_6$=H.

3. Examples

Example 1

A milk of lime was prepared by mixing under mechanical stirring water with dry sodium citrate (A1) as slaking additive (if present) and polymer P1 (if present) at an initial temperature between 40 and 41° C. (the amounts of slaking additives and polymer are indicated in Table 2 below). Subsequently, calcium oxide (quicklime raw material) was added. The obtained mixture was stirred for 25 min and then sieved through a 200 μm screen.

The obtained milk of lime was transferred into a stainless steel reactor, wherein the milk of lime was cooled down to 50° C. Then the milk of lime was carbonated by introducing an air/$CO_2$ mixture (26 vol-% $CO_2$). During the carbonation step, the reaction mixture was stirred with a speed of 1400 rpm. The kinetic of the reaction was monitored by online pH and conductivity measurements.

The characteristics of the prepared milks of lime and aqueous PCC suspensions are described in Tables 2 and 3 below.

TABLE 1

Characteristics of polymers used in Examples 1 to 8 (comp: comparative example).

| Polymer | m | n | p | $R_1$ | $R_2$ | $R_3$ | X | $M_w$ (g/mol) | PDI |
|---|---|---|---|---|---|---|---|---|---|
| P1 | 45 | 0 | 0 | H | — | — | Na | 4270 | 2.3 |
| P2 (comp) | 106 | 0 | 0 | H | — | — | Na | 10 000 | 3.0 |
| P3 (comp) | 106 | 38 | 0 | H | — | — | Na | 16 000 | 3.5 |
| P4 | 0 | 4 | 0 | — | — | — | 50 mol-% H/ 50 mol-% Na | 600 | 1.2 |
| P5 (comp) | 106 | 0 | 12 | H | H | C(=O)NHC(CH$_3$)$_2$—CH$_2$SO$_3$X | 54 mol-% H/ 46 mol-% Na | 12500 | 3.0 |
| P6 (comp) | branched polyethylene glycol, which does not fall under formula (I) | | | | | | | | |
| P7 | 5 | 10 | 0 | H | H | — | Na | 3090 | 2.1 |
| P8 | 15 | 0 | 1 | H | H | —C(=O)—O—CH$_2$CH$_3$ | Na | 2230 | 1.9 |
| P9 (comp) | 23 | 0 | 7 | H | H | —C(=O)—O—CH$_2$CH$_3$ | Na | 7015 | 3.0 |
| P10 | 29 | 0 | 0 | H | — | — | Na | 2695 | 2.0 |

The following slaking additives were used in the processes for producing PCC described in examples 1 to 8:

A1: Sodium citrate (commercially available from Sigma-Aldrich, Germany),
A2: Natural sugar (commercially available from any consumer market),
A3: Sodium gluconate (commercially available from Roquette Corp., France),
A4: Sodium diethylene triamine pentaacetic acid (commercially available from Akzo Nobel, Netherlands),
A5: Calcium lignosulfonate (commercially available from Burgo Group spa, Italy),
A6: Sodium lignosulfonate (commercially available from Burgo Group spa, Italy),
A7: Disodium tartrate dihydrate (commercially available from Dr. Paul Lohmann GmbH, Germany).

TABLE 2

Characteristics of produced milks of lime of Example 1 (comp: comparative example).

| Sample | P1 polymer amount [wt.-%/wt. CaO] | Sodium citrate (A1) amount [wt.-%/wt. CaO] | Solids content [wt.-%] | Brookfield viscosity [mPa · s] |
|---|---|---|---|---|
| 1 (comp) | — | 0.2 | 29.1 | 1220 |
| 2 (comp) | 0.2 | — | 28.8 | 269 |
| 3 | 0.1 | 0.1 | 28.9 | 300 |

TABLE 3

Characteristics of the obtained aqueous PCC suspensions of Example 1 (comp: comparative example). All samples had a calcite structure with the indicated aragonite content.

| Sample | Carbonation time [min/kg Ca(OH)$_2$] | Solids content [wt.-%] | Aragonite content [wt.-%] | $d_{50}$ [μm] | SSA [m$^2$/g] | pH | Brookfield viscosity [mPa · s] |
|---|---|---|---|---|---|---|---|
| 1 (comp) | carbonation was not carried out since viscosity of the milk of lime was too high | | | | | | |
| 2 (comp) | 62.0 | 36.6 | 33 | 1.16 | 5.8 | 8.0 | 2680 |
| 3 | 46.0 | 36.6 | <2 | 1.37 | 5.2 | 7.4 | 560 |

The results compiled in Table 2 show that the use of a slaking additive alone leads to a milk of lime having a high Brookfield viscosity (comparative sample 1). On the other hand, the use of a polymer alone results in a PCC suspension having a very high Brookfield viscosity (comparative sample 2, Table 3). Furthermore, the carbonation time of comparative sample 2 is longer compared to the inventive sample 3.

In contrast, inventive sample 3 confirms that the kinetic of carbonation and the crystallographic structure of the prepared PCC is not changed by using the inventive process, compared to a process involving the use of a slaking additive alone. Furthermore, by using the combination of the polymer and the slaking additive, the viscosity of the obtained PCC suspension is significantly reduced.

Example 2

A milk of lime was prepared by mixing under mechanical stirring water with dry sodium citrate (A1) as slaking additive and a polymer at an initial temperature between 40 and 41° C. (the amounts of slaking additives and polymer as well as the used polymer types are indicated in Table 4 below). Subsequently, calcium oxide (quicklime raw material) was added. The obtained mixture was stirred for 25 min and then sieved through a 200 μm screen.

The obtained milk of lime was transferred into a stainless steel reactor, wherein the milk of lime was cooled down to 50° C. Then the milk of lime was carbonated by introducing an air/CO$_2$ mixture (26 vol-% CO$_2$). During the carbonation step, the reaction mixture was stirred with a speed of 1400 rpm. The kinetic of the reaction was monitored by online pH and conductivity measurements.

The characteristics of the prepared milks of lime and aqueous PCC suspensions are described in Tables 4 and 5 below.

TABLE 4

Characteristics of produced milks of lime of Example 2 (comp: comparative example).

| Sample | Polymer | Polymer amount [wt.-%/wt. CaO] | Sodium citrate (A1) amount [wt.-%/wt. CaO] | Solids content [wt.-%] | Brookfield viscosity [mPa · s] |
|---|---|---|---|---|---|
| 4 (comp) | P2 | 0.15 | 0.05 | 28.0 | too high |
| 5 (comp) | P3 | 0.15 | 0.05 | 28.0 | too high |
| 6 | P4 | 0.20 | 0.10 | 28.2 | 418 |
| 7 (comp) | P5 | 0.20 | 0.10 | 28.2 | too high |
| 8 (comp) | P6 | 0.20 | 0.10 | 28.2 | foam build-up |

TABLE 5

Characteristics of the obtained aqueous PCC suspensions of Example 2 (comp: comparative example).

| Sample | Carbonation time [min/kg Ca(OH)$_2$] | Solids content [wt.-%] | pH | Brookfield viscosity [mPa · s] |
|---|---|---|---|---|
| 4 (comp) | carbonation was not carried out since viscosity of the milk of lime was too high | | | |
| 5 (comp) | carbonation was not carried out since viscosity of the milk of lime was too high | | | |
| 6 | 51.0 | 37.4 | 7.4 | 560 |
| 7 (comp) | carbonation was not carried out since viscosity of the milk of lime was too high | | | |
| 8 (comp) | not measurable since lime slaking resulted in severe foam build-up | | | |

The results given in Table 5 show that the use of the comparative polymers P2, P3, and P5, which had a M$_w$ of more than 6500 g/mol, resulted in a milk of lime having such a high Brookfield viscosities (above 1000 mPa·s at 25° C.±1° C. at 100 rpm) that a further processing of the samples was impossible. Furthermore, the use of comparative polymer P6, which had a structure different to that of formula (I), led to a severe foam build-up during the slaking step.

Example 3

A milk of lime was prepared by mixing under mechanical stirring water with dry sodium citrate (A1) as slaking additive (if present) and a polymer (if present) at an initial temperature between 40 and 41° C. (the amounts of slaking additives and polymer as well as the used polymer types are indicated in Table 6 below). Subsequently, calcium oxide (quicklime raw material) was added. The obtained mixture was stirred for 25 min and then sieved through a 200 μm screen.

The obtained milk of lime was transferred into a stainless steel reactor, wherein the milk of lime was cooled down to 50° C. Then the milk of lime was carbonated by introducing an air/CO$_2$ mixture (26 vol-% CO$_2$). During the carbonation step, the reaction mixture was stirred with a speed of 1400 rpm. The kinetic of the reaction was monitored by online pH and conductivity measurements.

The characteristics of the prepared milks of lime and aqueous PCC suspensions are described in Tables 6 and 7 below.

TABLE 6

Characteristics of produced milks of lime of Example 3 (comp: comparative example).

| Sample | Polymer | Polymer amount [wt.-%/wt. CaO] | Sodium citrate (A1) amount [wt.-%/wt. CaO] | Solids content [wt.-%] | Brookfield viscosity [mPa · s] |
|---|---|---|---|---|---|
| 9 (comp) | P7 | 0.2 | — | 28.7 | 545 |
| 10 | P7 | 0.1 | 0.1 | 28.0 | 376 |
| 11 (comp) | P8 | 0.2 | — | 28.6 | 203 |
| 12 | P8 | 0.1 | 0.1 | 29.0 | 197 |
| 13 (comp) | P9 | 0.2 | — | 28.1 | 349 |
| 14 (comp) | P9 | 0.1 | 0.1 | 28.4 | 420 |

TABLE 7

Characteristics of the obtained aqueous PCC suspensions of Example 3 (comp: comparative example). All samples had a calcite structure with the indicated aragonite content.

| Sample | Carbonation time [min/kg Ca(OH)$_2$] | Solids content [wt.-%] | Aragonite content [wt.-%] | $d_{50}$ [µm] | SSA [m$^2$/g] | pH | Brookfield viscosity [mPa · s] |
|---|---|---|---|---|---|---|---|
| 9 (comp) | 64 | 36.4 | 24 | 1.09 | 5.5 | 8.2 | 3310 |
| 10 | 46 | 35.4 | <2 | 1.47 | 4.3 | 7.3 | 433 |
| 11 (comp) | 63 | 36.3 | 24 | 1.12 | 6.1 | 8.5 | 2740 |
| 12 | 46 | 35.9 | <2 | 1.44 | 4.4 | 7.5 | 424 |
| 13 (comp) | 68 | 36.3 | 27 | 1.05 | 6.1 | 7.9 | 5370 |
| 14 (comp) | 46 | 35.7 | <2 | 1.43 | 4.4 | 7.3 | 1622 |

Using the inventive process (samples 10 and 12), it was possible to produce both a milk of lime and a PCC suspension with a high solids content and an acceptable viscosity (see Tables 6 and 7). As can be gathered from Table 7, the viscosity of the PCC suspension is much lower if a combination of polymer and slaking additive is used. Furthermore, the results compiled on Table 7 show that the specific carbonation time and the crystallographic structure was not significantly changed by using the inventive process, which means that the carbonation reaction is not significantly affected by the addition of the polymer during the slaking of the lime. In contrast, the comparative samples 9 and 11 show that the addition of a polymer alone, during the slaking step increases the specific carbonation time significantly. Table 7 also shows that the use of comparative polymer P9 having a M$_w$ of more than 6500 g/mol yielded a PCC suspension having an unacceptable high viscosity (comparative samples 13 and 14).

Example 4 (Comparative Example)

A comparative sample was prepared using the following sodium polyacrylates:

Sample 15: Dispex AA 4140 (commercially available from BASF SE, Germany, also known under trade name Dispex N40, in EP 0844213 A1).

A milk of lime was prepared by mixing water with 0.20 wt.-%, based on the total weight of the calcium oxide, of the respective polymer under mechanical stirring at an initial temperature between 40 and 41° C. Subsequently, calcium oxide (quicklime raw material) was added. The obtained mixture was stirred for 25 min and then sieved through a 200 µm screen.

The obtained milk of lime was transferred into a stainless steel reactor, wherein the milk of lime was cooled down to 50° C. Then the milk of lime was carbonated by introducing an air/CO$_2$ mixture (26 vol-% CO$_2$). During the carbonation step, the reaction mixture was stirred with a speed of 1400 rpm. The kinetic of the reaction was monitored by online pH and conductivity measurements.

The characteristics of the prepared milk of lime and aqueous PCC suspension are described in Table 8 below.

TABLE 8

Characteristics of produced milk of lime (MoL) and the obtained aqueous PCC suspension (PCC) of Example 4 (comp: comparative example).

| Sample | MoL solids content [wt.-%] | MoL Brookfield viscosity [mPa · s] | Carbonation time [min/kg Ca(OH)$_2$] | PCC solids content [wt.-%] | PCC Brookfield viscosity [mPa · s] |
|---|---|---|---|---|---|
| 15 (comp) | 27.9 | 238 | 67 | 36.0 | 4250 |

It can be gathered from Table 8 that the use of the above-mentioned sodium polyacrylate polymer alone during the slaking step, without slaking additives, yielded a PCC suspension having an unacceptably high viscosity.

Example 5

A milk of lime was prepared by mixing under mechanical stirring water with 0.05 wt.-%, based on the total weight of calcium oxide, dry sodium citrate (A1) (if used) and 0.2 wt.-%, based on the total weight of calcium oxide, polymer P10 (if used), as indicated in Table 9 below, at an initial temperature between 40 and 41° C. Subsequently, calcium oxide (quicklime raw material) was added. The obtained mixture was stirred for 25 min and then sieved through a 300 µm screen.

The obtained milk of lime was transferred into a stainless steel reactor, wherein the milk of lime was cooled down to 50° C. Then the milk of lime was carbonated by introducing an air/CO$_2$ mixture (26 vol-% CO$_2$). During the carbonation step, the reaction mixture was stirred with a speed of 1400 rpm. The kinetic of the reaction was monitored by online pH and conductivity measurements.

The employed amounts of polymers and the characteristics of the obtained milks of lime and aqueous PCC suspensions are described in Tables 9 and 10 below.

TABLE 9

Characteristics of produced milks of lime of Example 5
(comp: comparative example).

|  | Sample 16 (comp) | Sample 17 | Sample 18 (comp) |
|---|---|---|---|
| Polymer | — | P10 | P10 |
| Slaking additive | A1 | A1 | — |
| $T_{max}$ slaking [° C.] | 74 | 100 | 99.8 |
| Solids content [wt.-%] | 16.5 | 30.1 | 31.0 |
| Brookfield viscosity [mPa · s] | 31 | 386 | 550 |

TABLE 10

Characteristics of the obtained aqueous PCC suspensions of Example 5
(comp: comparative example).

|  | Sample 16 (comp) | Sample 17 | Sample 18 (comp) |
|---|---|---|---|
| Specific carbonation time [min/kg Ca(OH)$_2$] | 45 | 47 | 46 |
| Solids content [wt.-%] | 20.6 | 39.1 | 38.4 |
| Particle size $d_{50}$ [µm] | 1.49 | 1.40 | 1.23 |
| pH | 7.6 | 8.6 | 8.9 |
| pH after 8 days | 10.3 | 10.6 | 11.1 |
| Brookfield viscosity [mPa · s] | 25 | 328 | 1080 |

The results given in Table 10 clearly show that the process of the invention allows an increase of the solids content of the PCC slurries obtained without imparting the specific carbonation time, as well as the features of the so-obtained PCC particles.

Example 6

A milk of lime was prepared by mixing under mechanical stirring water 0.2 wt.-%, based on the total amount of the calcium oxide, of the polymer P1 (if present) with 0.15 wt.-%, based on the total amount of the calcium oxide, of a slaking additive at an initial temperature between 40 and 41° C. (the amounts of slaking additives and polymer as well as the used slaking additives are indicated in Table 11 below). Subsequently, calcium oxide (quicklime raw material) was added. The obtained mixture was stirred for 25 min and then sieved through a 200 µm screen.

The obtained milk of lime was transferred into a stainless steel reactor, wherein the milk of lime was cooled down to 50° C. Then the milk of lime was carbonated by introducing an air/CO$_2$ mixture (26 vol-% CO$_2$). During the carbonation step, the reaction mixture was stirred with a speed of 1400 rpm. The kinetic of the reaction was monitored by online pH and conductivity measurements.

The characteristics of the prepared milks of lime and aqueous PCC suspensions are described in Tables 11 and 12 below.

TABLE 11

Characteristics of produced milks of lime of Example 6
(comp: comparative example).

| Sample | Slaking additive | Polymer | Solids content [wt.-%] | Brookfield viscosity [mPa · s] |
|---|---|---|---|---|
| 19 (comp) | A1 | — | 13.6 | 32 |
| 20 | A1 | P1 | 26.0 | 275 |
| 21 | A2 | P1 | 26.5 | 220 |
| 22 | A3 | P1 | 27.1 | 371 |
| 23 | A4 | P1 | 25.6 | 327 |
| 24 | A5 | P1 | 25.9 | 266 |
| 25 | A6 | P1 | 26.4 | 393 |
| 26 | A7 | P1 | 25.0 | 273 |

TABLE 12

Characteristics of the obtained aqueous PCC suspensions
of Example 6 (comp: comparative example).

| Sample | Carbonation time [min/kg Ca(OH)$_2$] | Solids content [wt.-%] | $d_{50}$ [µm] | SSA [m$^2$/g] | pH | Brookfield viscosity [mPa · s] |
|---|---|---|---|---|---|---|
| 19 (comp) | 50 | 18.5 | 1.82 | 4.7 | 7.6 | 34 |
| 20 | 52 | 32.7 | 1.26 | 8.8 | 7.6 | 637 |
| 21 | 47 | 32.9 | 1.45 | 6.3 | 8.2 | 383 |
| 22 | 50 | 33.3 | 1.43 | 5.2 | 8.4 | 341 |
| 23 | 49 | 31.8 | 1.35 | 6.7 | 8.6 | 336 |
| 24 | 44 | 31.0 | 1.52 | 6.9 | 7.4 | 228 |
| 25 | 48 | 32.4 | 1.36 | 6.7 | 7.6 | 406 |
| 26 | 60 | 33.5 | 1.25 | 7.6 | 7.5 | 685 |

The results compiled in Table 12 confirm that the kinetic of carbonation is not changed by using the inventive process or even can be slightly speeded up (see sample 24). Both the milk of lime and the PCC suspension of all inventive samples (samples 20 to 26) revealed a low viscosity at a high solids content.

Example 7

A milk of lime was prepared by mixing under mechanical stirring 1800 l water with natural sugar (A2) as slaking additive and 0.15 wt.-%, based on the total weight of the calcium oxide, polymer P1 at an initial temperature of about 40° C. (the amount of slaking additive is indicated in Table 13 below). Subsequently, 370 kg calcium oxide (quicklime raw material) was added. The obtained mixture was stirred for 30 min at 50 rpm. Care was taken not to exceed a slaking temperature of 80° C.

The obtained milk of lime was transferred into a stainless steel reactor, wherein the milk of lime was cooled down to a temperature between 31 and 35° C. Then the milk of lime was carbonated by introducing an air/CO$_2$ mixture (200 Nm$^3$/h and 11 vol.-% CO$_2$). During the carbonation step, the reaction mixture was stirred with a speed of 200 rpm. The kinetic of the reaction was monitored by online pH and conductivity measurements.

The obtained aqueous suspension of precipitated calcium carbonate was sieved through a 45 µm screen in order to separate the PCC. The characteristics of the prepared aqueous PCC suspensions and the obtained PCC are described in Table 13 below.

TABLE 13

Characteristics of the obtained aqueous PCC suspensions and PCC of Example 7.

|  | Sample | |
| --- | --- | --- |
|  | 27 | 28 |
| Amount slaking additive [wt.-%/wt. CaO] | 0.25 | 0.20 |
| Starting temperature carbonation [° C.] | 35 | 31 |
| Reaction time carbonation [min] | 635 | 452 |
| Solids content | 28.6 | 27.5 |
| $d_{50}$ [μm] | 0.97 | 1.03 |
| SSA [$m^2$/g] | 13.6 | 17.0 |
| pH | 7.6 | 7.6 |
| Brookfield viscosity [mPa · s] | 400 | 230 |

The results compiled in Table 13 confirm that a PCC suspension with a low viscosity at a high solids content can be obtained by the inventive process.

Example 8

A milk of lime was prepared by mixing under mechanical stirring 1800 l water with natural sugar (A2) as slaking additive and 0.15 wt.-%, based on the total weight of the calcium oxide, polymer P1 at an initial temperature of about 40° C. (the amount of slaking additive is indicated in Table 14 below). Subsequently, 370 kg calcium oxide (quicklime raw material) was added. The obtained mixture was stirred for 30 min at 50 rpm. Care was taken not to exceed a slaking temperature of 80° C.

The obtained milk of lime was transferred into a stainless steel reactor, wherein the milk of lime was cooled down to a temperature between 31 and 35° C. Then the milk of lime was carbonated by introducing an air/$CO_2$ mixture (200 $Nm^3$/h and 11 vol.-% $CO_2$).

During the carbonation step, the reaction mixture was stirred with a speed of 200 rpm. The kinetic of the reaction was monitored by online pH and conductivity measurements.

The obtained aqueous suspension of precipitated calcium carbonate was sieved through a 45 nm screen in order to separate the PCC. The characteristics of the prepared aqueous PCC suspensions and the obtained PCC are described in Table 14 below.

TABLE 14

Characteristics of the obtained aqueous PCC suspensions and PCC of Example 8.

|  | Sample | | |
| --- | --- | --- | --- |
|  | 29 | 30 | 31 |
| Amount slaking additive [wt.-%/wt. CaO] | 0.25 | 0.20 | 0.20 |
| Starting temperature carbonation [° C.] | 35 | 31 | 35 |
| Reaction time carbonation [min] | 522 | 457 | 491 |
| Solids content | 26.6 | 27.7 | 27.8 |
| $d_{50}$ [μm] | 1.14 | 1.20 | 1.27 |
| SSA [$m^2$/g] | 13.6 | 11.0 | 9.3 |
| pH | 8.4 | 8.2 | 8.1 |
| Brookfield viscosity [mPa · s] | 450 | 286 | 220 |

The results compiled in Table 14 confirm that a PCC suspension with a low viscosity at a high solids content can be obtained by the inventive process.

The invention claimed is:

1. A process for producing an aqueous suspension of precipitated calcium carbonate comprising the steps of:

i) providing a calcium oxide containing material,
ii) providing at least one water-soluble polymer having a molecular weight $M_w$ in the range from 200 to 6500 g/mol, wherein the at least one polymer has the chemical structure of formula (I)

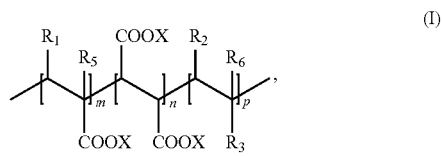

wherein n, m, and p are integers and at least one of n, m, or p is greater than zero and n+m+p is less than or equal to 70,
$R_1$ is H or $CH_3$,
$R_2$ is H or $CH_3$,
$R_3$ is —C(=O)—O—$R_4$ or —C(=O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other,
$R_5$ is H or $CH_3$,
$R_6$ is H or $CH_3$, and
X is H and/or M, wherein M is Na, K, Li, Mg, and/or Ca, and
wherein the structural units

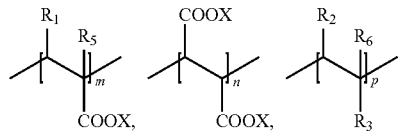

are arranged randomly, regularly and/or in blocks,
iii) providing at least one slaking additive, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof,
iv) preparing a milk of lime by mixing water, the calcium oxide containing material of step i), the at least one polymer of step ii), and the at least one slaking additive of step iii), wherein the calcium oxide containing material and the water are mixed in a weight ratio from 1:1 to 1:12, and
v) carbonating the milk of lime obtained from step iv) to form an aqueous suspension of precipitated calcium carbonate.

2. The process of claim 1, wherein the at least one polymer has the chemical structure of formula (II)

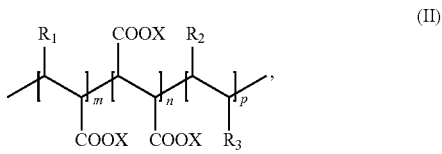

wherein n, m, and p are integers and at least one of n, m, or p is greater than zero and n+m+p is less than or equal to 70, $R_1$ is H or $CH_3$, $R_2$ is H or $CH_3$, $R_3$ is —C(═O)—O—$R_4$ or —C(═O)—NH—$R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, and X is H and/or M, wherein M is Na, K, Li, Mg, and/or Ca, and wherein the structural units

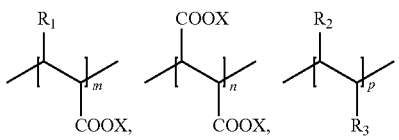

are arranged randomly, regularly and/or in blocks.

3. The process of claim 1, wherein $R_1$ is H and $R_5$ is H.

4. The process of claim 1, wherein step iv) comprises the steps of:
   a1) mixing the at least one polymer of step ii) and the at least one slaking additive of step iii) with water, and
   a2) adding the calcium oxide containing material of step i) to the mixture of step a1).

5. The process of claim 1, wherein step iv) comprises the steps of:
   b1) mixing the calcium oxide containing material of step i), the at least one polymer of step ii), and the at least one slaking additive of step iii), and
   b2) adding water to the mixture of step b1).

6. The process of claim 1, wherein in step iv) the calcium oxide containing material of step i), the at least one polymer of step ii), the at least one slaking additive of step iii), and water are mixed simultaneously.

7. The process of claim 1, wherein in step iv) the calcium oxide containing material and the water are mixed in a weight ratio from 1:1 to 1:9.

8. The process of claim 1, wherein in step iv) the calcium oxide containing material and the water are mixed in a weight ratio from 1:2.5 to 1:6.

9. The process of claim 1, wherein in step iv) the calcium oxide containing material and the water are mixed in a weight ratio from 1:3 to 1:5.

10. The process of claim 1, wherein the at least one slaking additive is selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and any mixture thereof.

11. The process of claim 1, wherein the at least one slaking additive is sodium citrate and/or saccharose.

12. The process of claim 1, wherein the milk of lime of step iv) has a Brookfield viscosity from 1 to 1000 mPa·s at 25° C.

13. The process of claim 1, wherein the milk of lime of step iv) has a Brookfield viscosity from 5 to 800 mPa·s at 25° C.

14. The process of claim 1, wherein the milk of lime of step iv) has a Brookfield viscosity from 10 to 600 mPa·s at 25° C.

15. The process of claim 1, wherein the suspension of PCC of step v) has a Brookfield viscosity of less than or equal to 1000 mPa·s at 25° C.

16. The process of claim 1, wherein the suspension of PCC of step v) has a Brookfield viscosity of less than or equal to 800 mPa·s at 25° C.

17. The process of claim 1, wherein the suspension of PCC of step v) has a Brookfield viscosity of less than or equal to 600 mPa·s at 25° C.

18. The process of claim 1, wherein the suspension of PCC of step v) has a solids content of at least 20 wt.-%, based on the total weight of the suspension.

19. The process of claim 1, wherein the suspension of PCC of step v) has a solids content of from 20 to 50 wt.-%, based on the total weight of the suspension.

20. The process of claim 1, wherein the suspension of PCC of step v) has a solids content of from 25 to 45 wt.-%, based on the total weight of the suspension.

21. The process of claim 1, wherein the suspension of PCC of step v) has a solids content of from 30 to 40 wt.-%, based on the total weight of the suspension.

22. The process of claim 1, wherein the at least one slaking additive is added in an amount from 0.01 to 2 wt.-%, based on the total amount of calcium oxide containing material.

23. The process of claim 1, wherein the at least one slaking additive is added in an amount from 0.05 to 1 wt.-%, based on the total amount of calcium oxide containing material.

24. The process of claim 1, wherein the at least one slaking additive is added in an amount from 0.06 to 0.8 wt.-%, based on the total amount of calcium oxide containing material.

25. The process of claim 1, wherein the at least one slaking additive is added in an amount from 0.07 to 0.5 wt.-%, based on the total amount of calcium oxide containing material.

26. The process of claim 1, wherein the water used in mixing step iv) has a temperature that is adjusted to be in the range from more than 0° C. and less than 100° C.

27. The process of claim 1, wherein the water used in mixing step iv) has a temperature that is adjusted to be in the range from 1° C. to 70° C.

28. The process of claim 1, wherein the water used in mixing step iv) has a temperature that is adjusted to be in the range from 2° C. to 50° C.

29. The process of claim 1, wherein the water used in mixing step iv) has a temperature that is adjusted to be in the range from 30° C. to 50° C.

30. The process of claim 1, wherein the water used in mixing step iv) has a temperature that is adjusted to be in the range from 35° C. to 45° C.

31. The process of claim 1, wherein the milk of lime obtained from step iv), which is employed in step v), has a temperature that is adjusted to be in the range from 20° C. to 60° C.

32. The process of claim 1, wherein the milk of lime obtained from step iv), which is employed in step v), has a temperature that is adjusted to be in the range from 30° C. to 50° C.

33. The process of claim 1, wherein the milk of lime is screened after step iv) and before step v).

34. The process of claim 1, wherein the milk of lime is screened after step iv) and before step v) with a screen having a sieve size from 100 to 300 μm.

35. A process for producing precipitated calcium carbonate comprising the steps i) to v) of the process according to claim 1, and further a step vi) of separating the precipitated calcium carbonate from the aqueous suspension obtained from step v).

36. The process of claim 35, wherein the precipitated calcium carbonate is a dried precipitated calcium carbonate, and the process further comprises a step vii) of drying the separated precipitated calcium carbonate obtained from step vi).

37. The process of claim 36, wherein the dried precipitated calcium carbonate is a dried powder of precipitated calcium carbonate.

* * * * *